United States Patent

Hatanaka et al.

[11] 4,451,634
[45] May 29, 1984

[54] SILICONE ELASTOMER COMPOSITIONS SUITABLE FOR ULTRAVIOLET RAY CURING

[75] Inventors: Masayuki Hatanaka, Ora; Atsushi Kurita, Ota, both of Japan

[73] Assignee: General Electric Company, Waterford, N.Y.

[21] Appl. No.: 457,348

[22] Filed: Jan. 12, 1983

[51] Int. Cl.$^3$ .............................................. C08G 77/06
[52] U.S. Cl. ..................................... 528/24; 528/31; 528/32; 204/159.13
[58] Field of Search ........................... 528/24, 31, 32; 204/159.13

[56] References Cited

U.S. PATENT DOCUMENTS 4,335,035  6/1982  Hatanaka et al. .................... 528/24

Primary Examiner—Melvyn I. Marquis
Attorney, Agent, or Firm—Gary L. Loser

[57] ABSTRACT

Silicone elastomeric compositions suitable for ultraviolet ray curing comprising:

(A) 100 parts by weight of a polyorganosiloxane of the general formula:

$$(CH_3)_2R^1SiO-R_2^2SiO]_nSiR^1(CH_3)_2 \quad (1)$$

wherein $R^1$ represents hydrogen or a monovalent radical selected from the group consisting of methyl, vinyl, and hydroxy, $R^2$ represents hydrogen or a substituted or unsubstituted monovalent hydrocarbon radical, 0.02–49.95% based on the total number of $R^1$ and $R^2$ groups are vinyl radicals 0.05–49.98% based on the total number of $R^1$ and $R^2$ groups are hydrogen and n represents a number from 10–10,000.

(B) 0.5–10 parts by weight of a polyorganosiloxane having an average formula:

$$(CH_2=CH)_aSiO_{\frac{4-a-b}{2}}^{R_b^3}$$

wherein $R^3$ represents a substituted or unsubstituted monovalent hydrocarbon radical other than vinyl, a represents a number of $0.01 \leq a \leq$ in an average, and b represents a number of $0 \leq b < 3$ in an average, and $a+b$ being a number from 1 to 3 inclusive, and (C) 0.1–10.0 parts by weight a peroxyester of the general formula:

$$R^4-O-O-\overset{O}{\underset{\|}{C}}-R^5$$

wherein $R^4$ represents a substituted or unsubstituted monovalent aliphatic hydrocarbon group and $R^5$ represents a substituted or unsubstituted monovalent aromatic hydrocarbon radical.

9 Claims, No Drawings

SILICONE ELASTOMER COMPOSITIONS SUITABLE FOR ULTRAVIOLET RAY CURING

BACKGROUND OF THE INVENTION

The present invention relates to silicone elastomeric compositions curable by ultraviolet rays and which exhibit excellent adhesion to various substrates.

The technology of curing silicone elastomeric compositions by ultraviolet rays for use as a junction coating of semiconductors is known. In the specification of U.S. Pat. No. 3,726,710, there is disclosed a composition comprising a vinyl group-containing polyorgnosiloxane having a sensitizer added thereto and which is curable by exposing it to high-intensity ultraviolet rays. However, this composition has the shortcoming that only the surface is uniformly cured whereas the inside thereof is not uniformly cured.

U.S. Pat. No. 3,816,282 discloses a composition comprising a mercapto group-containing polyorganosiloxane, a polymethylvinylsiloxane and an organic peroxide, and which effects crosslinking by addition reaction. However, this composition has poor shelf stability and tends to gel during storage at room temperature. Other disadvantages of such compositions are that several steps are required for the synthesis of the mercapto group-containing polyorganosiloxane, that an offensive smell peculiar to the mercapto group is emitted, that the thermal resistance particular to silicones is lost and that these compositions attack metals and change to sulfides when heated. However, such compositions do show good adhesiveness to metals.

In the specification of Japanese Patent Publication No. 40334/1977, there is disclosed a composition comprising a vinyl group-containing polyorganosiloxane, a polyorganohydrogensiloxane and a sensitizer and which crosslinks by addition reaction. However, this composition is inadequate since the surface is thoroughly cured whereas the inside thereof is insufficiently cured, and additionally, foaming may occur.

In the specification of Japanese Patent Kokai No. 19682/1973, there is disclosed a composition comprising an acrylic group-containing polyorganosiloxane and a sensitizer. Though it has an excellent photo-sensitivity, this composition has defects in that it is too susceptible to oxygen, photo-sensitivity decreases with time, and dark decay thereof is significant. Another defect of such composition is that the acrylic group-containing polyorganosiloxane requires several steps to synthesize and the resulting silicone has poor heat resistance.

Japanese Patent Kokai No. 69197/1979 discloses a composition comprising an azido group-containing polyorganosiloxane, a vinyl group-containing polyorganosiloxane and an organic peroxide. This composition suffers from yellowing which is unavoidable. However, it has advantages of excellent sensitivity, non-susceptibility to oxygen and only insignificant change in sensitivity with time.

In Japanese Patent Kokai No. 125123/1980 there is disclosed a composition comprising a vinyl group-containing polyorganosiloxane and or organic peroxide which is cured by exposure to ultraviolet rays of wave lengths of 100–300 nm. However, this process is susceptible to oxygen, requires time for curing, and has an insufficient adhesion.

Accordingly, investigations were made for the purpose of overcoming the above defects and developing a composition which cures to a polyorganosiloxane elastomer upon exposure to ultraviolet rays and which adheres to various surfaces. The present inventors have found that the surface and inside of a polyorganosiloxane can cure effectively and uniformly with excellent adhesive properties by adding to a polyorganohydrogensiloxane having vinyl groups and hydrogen atoms in the same molecules a low molecular weight vinyl group-containing polyorganosiloxane and a peroxyester of an aliphatic alcohol.

SUMMARY OF THE INVENTION

The present invention relates to silicone elastomeric compositions suitable for ultraviolet ray curing comprising:

(a) 100 parts by weight of a polyorganosiloxane of the general formula:

$$(CH_3)_2R^1SiO-[R_2^2SiO]SiR^1(CH_3)_2 \qquad (1)$$

wherein $R^1$ represents a monovalent radical selected from the group consisting of methyl, vinyl, hydrogen and hydroxy, $R^2$ represents hydrogen or a substituted or unsubstituted monovalent hydrocarbon radical, 0.02–49.95% based on the total of $R^1$ and $R^2$ are vinyl radicals, 0.05–49.98% based on the total of $R^1$ and $R^2$ are hydrogen and n represents a number from 10–10,000.

(B) 0.5–10 parts by weight of a polyorganosiloxane having an average formula:

$$(CH_2=CH)_a \underset{|}{\overset{R_b^3}{Si}} O_{\frac{4-a-b}{2}} \qquad (2)$$

wherein $R^3$ represents a substituted or unsubstituted monovalent hydrocarbon radical other than vinyl, a represents a number of $0.01 \leq a \leq 1$ in an average, and b represents a number of $0 \leq b \leq 3$ in an average, and a+b being a number from 1 to 3 inclusive, and (C) 0.1–10.0 parts by weight a peroxyester of the general formula:

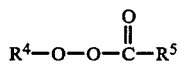

$$R^4-O-O-\underset{\|}{\overset{O}{C}}-R^5$$

wherein $R^4$ represents a substituted or unsubstituted monovalent aliphatic hydrocarbon group and $R^5$ represents a substituted or unsubstituted monovalent aromatic hydrocarbon group.

DETAILED DESCRIPTION

Polyorganohydrogensiloxane (A) of this invention is represented by the above-said general formula (1), wherein $R^1$ is a monovalent radical selected from the group consisting of methyl, vinyl, hydrogen and hydroxy and $R^2$ is hydrogen or a substituted or unsubstituted monovalent hydrocarbon radical. The remaining $R^2$ radicals may include alkyl groups such as methyl, ethyl, propyl, butyl, pentyl, hexyl, octyl and decyl; alkenyl groups such as allyl; cycloalkyl groups such as cyclohexyl; aralkyl groups such as beta-phenylethyl; aryl groups such as phenyl; and any of the above groups wherein a part or all of the hydrogen atoms are replaced, for example, by halogen atoms, 3,3,3-trifluoropropyl radicals or cyanoethyl radicals. From the viewpoint of ease of the syntehsis, strength of the cured film and heat resistance, it is preferable that all of the $R^2$ radicals be either methyl or methyl and phenyl.

In the present invention it is important that polyorganohydrogensiloxane (A) contain silicon-bonded vinyl groups and hydrogen atoms in the same molecule. The number of vinyl groups based on the total number of $R^1$ and $R^2$ groups ranges from 0.02-49.95% and the number of hydrogen atoms based on the total number of $R^1$ and $R^2$ groups ranges from 0.05-49.98%. When the number of silicon-bonded vinyl groups or hydrogen atoms is less than the above-said ranges, respectively, the adhering ability of the cured composition is reduced. When the number of these substituents is more than the above-said ranges, respectively, thermal resistance is reduced or the curing rate is inadequate. When the polyorganohydrogensiloxane molecule contains silicon-bonded vinyl groups and hydrogen atoms within the above-said ranges, no foaming occurs upon exposure to ultraviolet rays due to generation of hydrogen gas, a short time is required for effective curing and sufficient adhesion to many substrates is provided. From the viewpoint of ease of the synthesis and thermal resistance, it is preferable that the number of silicon-bonded vinyl groups and hydrogen atoms be 0.02-5% and 0.05-10%, respectively, based on the total number of $R^1$ and $R^2$ groups. The number n is in the range of 10-10,000, but to insure effective crosslinking it is preferable that the viscosity of the polyorganohydrogensiloxane be at least 500 cSt.

Vinyl group-containing polyorganosiloxane (B) of this invention is represented as average formula (2), wherein $R^3$ is a substituted or unsubstituted monovalent hydrocarbon group other than vinyl. There may be included alkyl groups such as methyl, ethyl, propyl, butyl, pentyl, hexyl, octyl and decyl; alkenyl groups such as allyl; cycloalkyl groups such as cyclohexyl; aralkyl groups such as betaphenylethyl; aryl groups such as phenyl; and any of the above groups wherein a part or all of the hydrogen atoms are replaced, for example, by halogen atoms, 3,3,3-trifluoropropyl radicals or cyanoethyl radicals.

In this invention vinyl groups enhance adhesion properties of the composition and, therefore, the number of vinyl groups per silicon atom must be in the range above-mentioned. It is preferable that the number of vinyl groups be less than 50% of the total number of organic groups and that the viscosity of the vinyl group-containing polyorganosiloxane (B) be below 100 cSt at 25° C. When the number of vinyl groups or the viscosity are outside of these ranges, respectively, a slightly longer curing time is required, or the heat resistance of the cured composition becomes less effective.

The siloxane chain of the vinyl group-containing polyorganosiloxane (B) may be linear, cyclic or branched. Considering ease of synthesis, adhesion properties and short exposure times to ultraviolet rays, it is most preferable that the general formula of component (B) be:

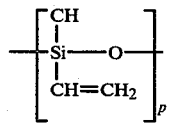

(4)

wherein p represents a number from 3-10 inclusive. Component (B) may be either one kind of polyorganosiloxane or a mixture of two or more types of polyorganosiloxanes.

The amount of component (B) is 0.5-10 parts by weight, and preferably 0.5-5 parts by weight per 100 parts by weight of polyorganohydrogensiloxane (A). When the amount of component (B) is less than 0.5 parts by weight, the curing rate is poor. On the other hand, when the amount of component (B) is more than 10 parts by weight, no improved effect is obtained relative to the amount added and heat resistance becomes lower.

Peroxyester (C) of this invention is decomposed upon exposure to ultraviolet rays to generate a radical, thereby causing curing of components (A) and (B).

Group $R^4$ in the above formula (3) imparts a compatibility with the above polyorganosiloxane. Group $R^4$ is a substituted or unsubstituted monovalent aliphatic hydrocarbon group having preferably up to 12 carbon atoms. The structure of group $R^4$ is not particularly limited. From the viewpoint of compatibility, tert-butyl group is preferred.

Group $R^5$ in formula (3) is any substituted or unsubstituted monovalent aromatic hydrocarbon group and is not particularly limited; however, from the viewpoint of effectiveness of reaction, a benzene ring-containing group is preferred.

The peroxyesters of the present invention are translucent and compatible with the above polyorganosiloxanes. Suitable peroxyesters include, for example, t-butyl peroxybenzoate, t-butyl peroxy-4-chlorobenzoate, t-butyl peroxy-2,4-dichlorobenzoate, and t-butyl peroxy-4-toluoate. Among these peroxyesters, t-butyl peroxybenzoate is particularly preferred since it has an excellent solubility, requires no solvent, and is easily synthesized.

The amount of the peroxyester (C) is 0.1-10.0 parts by weight, preferably 0.5-5.0 parts by weight, per 100 parts by weight of the polyorganohydrogensiloxane (A). If the amount of the peroxyester is less than 0.1 part by weight, the curing rate is slow and sufficient crosslinking is not obtained. On the other hand, even when the amount of the peroxyester is more than 10.0 parts by weight, the expected effects are not improved.

The composition of this invention comprises, as discussed hereinabove, a polyorganosiloxane containing silicon-bonded vinyl groups and hydrogen atoms, a vinyl group-containing low molecular weight polyorganosiloxane and a peroxyester. Such composition cures upon exposure to ultraviolet rays and will adhere to many different kinds of substrates. The type of UV source is not particularly limited; however, a high pressure mercury lamp is particularly preferable.

To improve the physical properties of the cured composition, if necessary, there may be added a fine silica such as fumed silica, precipitated silica, calcined silica or silica aerogel, etc. These fillers may be used alone or as a mixture of two or more silicas, either without surface treatment or having their surface treated with an organosilicon compound such as polydimethylsiloxane, octamethylcyclotetrasiloxane or hexamethyldisilazane.

The present invention provides a polyorganosiloxane composition which cures effectively and uniformly from inside to surface upon exposure to ultraviolet rays in the presence of a peroxyester formed from an aromatic carboxylic acid and an aliphatic alcohol.

The composition of this invention is suitable for junction coating of semiconductors and coating material for potting semiconductor devices.

The following examples further illustrate the present invention wherein parts are given by weight.

EXAMPLE 1

By the composition ratios shown in Table 1, Samples 1–25 were prepared. Among them Samples 2 and 6 were prepared by winding a polyorganohydrogensiloxane around a two-roll mill, adding therein while on the mill a low molecular weight polyorganosiloxane and tert-butyl peroxybenzoate, and diluted tenfold with toluene. The other samples were prepared by mixing in a vertical mixer. These samples were coated on the substrates represented in Table 2 in layers 50 micron thick. For Samples 2 and 6, toluene was removed by air drying. The coated samples were exposed to ultraviolet rays at a distance of 10 cm using a 160 w/cm high pressure mercury lamp (UV-7000, made by Ushio Electric Co., Ltd.) for 30 seconds. All of the samples investigated and the results are shown in Table 2.

COMPARATIVE EXAMPLE 1

To 100 parts of polyorganosiloxane having 10 mole percent methylvinylsiloxane units, the remainder being dimethylsiloxane units, and having a viscosity of 4,000 cSt at 25° C., 2 parts of tert-butyl peroxybenzoate were added and uniformly dispersed by a vertical mixer to obtain Sample 26.

COMPARATIVE EXAMPLE 2

To 100 parts of polyorganosiloxane, the same as used in Comparative Example 1, 4 parts of tetravinyltetramethylcyclotetrasiloxane and 2 parts of tert-butyl peroxybenzoate were added and uniformly dispersed by a vertical mixer, thus providing Sample 27.

COMPARATIVE EXAMPLE 3

To 95 parts of polyorganosiloxane, the same as used in Comparative Example 1, 5 parts of polyorganohydrogensiloxane having 20 mole percent methylhydrogensiloxy units, the remainder being dimethylsiloxy units, and having a viscosity of 5,000 cSt at 25° C. and 2 parts of tert-butyl peroxybenzoate were added and uniformly dispersed by a vertical mixer, to obtain Sample 28.

COMPARATIVE EXAMPLE 4

To 100 parts of Sample 28 prepared in Comparative Example 3, 3 parts of tetravinyltetramethylcyclotetrasiloxane were mixed under stirring and dispersed uniformly to provide Sample 29.

COMPARATIVE EXAMPLE 5

To 100 parts of polyorganohydrogensiloxane having 1 mole percent of methylvinyl siloxy units and 1 mole percent of methylhydrogensiloxy units, the remainder being dimethylsiloxy units, and having a viscosity of 3,000 cSt at 25° C., 6.5 parts of tert-butyl peroxybenzoate were dispersed uniformly by a vertical mixer to provide Sample 30.

Samples 26 to 30, prepared in Comparative Example 1 to 5, were coated in the same manner as described in Example 1 to various substrates and exposed under the same conditions as Example 1 to a high pressure mercury lamp. Foaming was observed in Sample 28 (Comparative Example 3) and Sample 29 (Comparative Example 4), whereas the other three samples appeared to cure satisfactorily. The adhesion properties of the specimens which did not foam were examined, and the results are shown in Table 2.

EXAMPLE 2

To 100 parts of polyorganohydrogensiloxane endblocked by dimethylhydrogensiloxy units, having 0.5 mole percent of methylvinylsiloxy units and 0.5 mole percent of methylhydrogensiloxy units, the remainder being dimethylsiloxy units, and having a viscosity of 3,000 cSt at 25° C., 3.0 parts of tetravinyltetramethylcyclotetrasiloxane and 4.0 parts of tert-butyl peroxybenzoate were added and uniformly dispersed by a vertical mixer, to obtain Sample 31.

Sample 31 was coated as described in Example 1 to various substrates and exposed to UV radiation using a high pressure mercury lamp of 80 w/cm. All specimens cured satisfactorily. Adhesion properties were examined for specimens which did not foam. The results are shown in Table 2.

TABLE 1

| | Ingredient | | | | | | Polyorganosiloxane (B) |
|---|---|---|---|---|---|---|---|
| | Polyorganohydrogensiloxane (A) | | | | | | tetravinyltetramethylcyclotetrasiloxane (parts) |
| Sample No. | Terminal*1 unit | Methylvinylsiloxy unit (mole %) | Methylhydrogensiloxy unit (mole %) | Dimethylsiloxy unit (mole %) | Diphenylsiloxy unit (mole %) | Viscosity*2 (cSt) or polymerization degree | Amount (parts) | |
| 1 | A | 0.5 | 0.5 | 99.0 | | 2,500 | 100 | 2.0 |
| 2 | A | 0.5 | 1.0 | 98.5 | | n 5,000 | 100 | 4.0 |
| 3 | A | 0.5 | 3.0 | 96.5 | | 8,000 | 100 | 5.0 |
| 4 | A | 0.5 | 10.0 | 89.5 | | 1,900 | 100 | 6.0 |
| 5 | A | 0.5 | 30.0 | 69.5 | | 20,000 | 100 | 8.0 |
| 6 | B | 1.0 | 0.5 | 98.5 | | n 6,000 | 100 | |
| 7 | A | 1.0 | 1.0 | 95.0 | 3.0 | 5,000 | 100 | |
| 8 | A | 1.0 | 3.0 | 96.0 | | 2,900 | 100 | |
| 9 | A | 1.0 | 10.0 | 89.0 | | 800 | 100 | |
| 10 | B | 1.0 | 30.0 | 69.0 | | 100,000 | 100 | |
| 11 | A | 3.0 | 0.5 | 96.5 | | 6,300 | 100 | |
| 12 | A | 3.0 | 1.0 | 96.0 | | 10,000 | 100 | |
| 13 | A | 3.0 | 3.0 | 94.0 | | 3,000 | 100 | |
| 14 | A | 3.0 | 10.0 | 87.0 | | 4,000 | 100 | |
| 15 | C | 3.0 | 30.0 | 67.0 | | 9,200 | 100 | |
| 16 | A | 10.0 | 0.5 | 89.5 | | 50,000 | 100 | |
| 17 | A | 10.0 | 1.0 | 89.0 | | 5,800 | 100 | |
| 18 | A | 10.0 | 3.0 | 87.0 | | 7,400 | 100 | |

TABLE 1-continued

| | | | Ingredient | | | |
|---|---|---|---|---|---|---|
| 19 | A | 10.0 | 10.0 | 80.0 | 1,300 | 100 |
| 20 | A | 10.0 | 30.0 | 60.0 | 3,800 | 100 |
| 21 | A | 30.0 | 0.5 | 69.5 | 6,700 | 100 |
| 22 | A | 30.0 | 1.0 | 69.0 | 3,200 | 100 |
| 23 | A | 30.0 | 3.0 | 67.0 | 8,800 | 100 |
| 24 | C | 30.0 | 10.0 | 60.0 | 2,000 | 100 |
| 25 | A | 30.0 | 30.0 | 40.0 | 500 | 100 |

| Sample No. | Polyorganosiloxane (B) General formula and viscosity are described below (parts) | | | Peroxy ester (C) tert-butyl peroxybenzoate (parts) |
|---|---|---|---|---|
| 1 | | $(CH_2=CH)_{0.3}(CH_3)_{2.2}SiO_{0.75}$ | $(CH_2=CH)_{0.8}(CH_3)_{0.2}SiO_{1.5}$ | 1.0 |
| 2 | | Viscosity (25° C.) 50 cSt | Viscosity (25° C.) 80 cSt | 2.0 |
| 3 | | | | 3.0 |
| 4 | | | | 4.0 |
| 5 | | | | 5.0 |
| 6 | 7.0 | | | 6.0 |
| 7 | 5.0 | | | 5.0 |
| 8 | 3.5 | | | 4.0 |
| 9 | 3.0 | | | 3.0 |
| 10 | 1.0 | | | 2.0 |
| 11 | | 3.0 | | 2.5 |
| 12 | | 7.0 | | 5.5 |
| 13 | | 9.0 | | 6.5 |
| 14 | | 5.0 | | 4.5 |
| 15 | $[(CH_2=CH)(CH_3)SiO]_p$ | 4.0 | | 3.5 |
| 16 | $p = 3\sim8$, mixture | $(CH_2=CH)_{0.5}(CH_3)_{1.5}SiO$ | 8.0 | 4.0 |
| 17 | | Viscosity (25° C.) 10 cSt | 5.0 | 40 |
| 18 | | | 2.0 | 4.0 |
| 19 | | | 2.0 | 4.0 |
| 20 | | | 6.0 | 4.0 |
| 21 | | | | 4.0 | 0.8 |
| 22 | | | | 4.0 | 2.8 |
| 23 | | | | 4.0 | 4.3 |
| 24 | | | | 4.0 | 6.2 |
| 25 | | | | 4.0 | 5.0 |

NOTES:
*¹A: Trimethylsiloxy unit
B: Hydroxy group
C: Dimethylvinylsiloxy unit
*²If n is described, the number represents polymerization degree

TABLE 2

| | Example No. | | | | |
|---|---|---|---|---|---|
| | Example 1 | Comparative Example 1 | Comparative Example 2 | Comparative Example 5 | Example 2 |
| | Sample No. | | | | |
| Substrate | 1~25 | 26 | 27 | 30 | 31 |
| Phenol resin | o | Δ | Δ | Δ | o |
| Epoxy resin | o | x | Δ | Δ | o |
| Polycarbonate resin | o | Δ | Δ | Δ | o |
| Polyimide resin | o | x | x | x | o |
| Polyester resin | o | x | x | x | o |
| Polystyrene resin | o | x | x | x | o |
| Polyphenylene sulfide resin | o | x | x | x | o |
| Acrylic resin | o | x | x | x | o |
| Soft steel | o | Δ | Δ | Δ | o |
| Stainless steel | o | Δ | Δ | Δ | o |
| Copper | o | x | Δ | x | o |
| Bronz | o | x | Δ | x | o |
| Aluminum | o | x | Δ | Δ | o |
| Corrosion resistant aluminum | o | x | Δ | Δ | o |
| Chrome | o | x | x | x | o |
| Nickel | o | x | x | x | o |
| Tin | o | x | x | x | o |
| Phosphor-treated Nickel | o | x | x | x | o |
| Gold | o | x | x | x | o |
| Silver | o | x | x | x | o |
| Platinum | o | | | x | o |
| Silicon chrystal | o | Δ | Δ | x | o |
| Glass | o | Δ | Δ | Δ | o |

TABLE 2-continued

| | Example No. | | | | |
|---|---|---|---|---|---|
| | Example 1 | Comparative Example 1 | Comparative Example 2 | Comparative Example 5 | Example 2 |
| | | | Sample No. | | |
| Substrate | 1~25 | 26 | 27 | 30 | 31 |
| Quartz | o | Δ | Δ | Δ | o | o = excellent
Δ = fair
x = poor

We claim:

1. Silicone elastomeric compositions suitable for ultraviolet ray curing comprising:
   (A) 100 parts by weight of a polyorganosiloxane of the general formula:

$$(CH_3)_2R^1SiO\text{---}R_2{}^2SiO)_nSiR^1(CH_2) \quad (1)$$

wherein $R^1$ represents hydrogen or a monovalent radical selected from the group consisting of methyl, vinyl, and hydroxy, $R^2$ represents hydrogen or a substituted or unsubstituted monovalent hydrocarbon radical, 0.02–49.95% based on the total number of $R^1$ and $R^2$ groups are vinyl radicals 0.05–49.98% based on the total number of $R^1$ and $R^2$ groups are hydrogen and n represents a number from 10–10,000
   (B) 0.5–10 parts by weight of a polyorganosiloxane having an average formula:

$$(CH_2=CH)_aSi O_{\frac{4-a-b}{2}}^{R_b^3}$$

wherein $R^3$ represents a substituted or unsubstituted monovalent hydrocarbon radical other than vinyl, a represents a number of $0.01 \leq a \leq 1$ in an average, and b represents a number of $0 \leq b < 3$ in an average, and a+b being a number from 1 to 3 inclusive, and
   (C) 0.1–10.0 parts by weight a peroxyester of the general formula:

$$R^4\text{---}O\text{---}O\text{---}\overset{\overset{O}{\|}}{C}\text{---}R^5$$

wherein $R^4$ represents a substituted or unsubstituted monovalent aliphatic hydrocarbon group and $R^5$ represents a substituted or unsubstituted monovalent aromatic hydrocarbon radical.

2. Silicone elastomeric compositions according to claim 1 wherein said polyorganohydrogensiloxane (A) has a viscosity of at least 500 cSt at 25° C.

3. Silicone elastomer compositions according to claim 1 wherein 0.02–5% based on the total number of $R^1$ and $R^2$ groups are vinyl groups and 0.05–10% based on the total number of $R^1$ and $R^2$ groups are hydrogen groups.

4. Silicone elastomer compositions according to claim 1 wherein the $R^2$ groups other than vinyl and hydrogen are methyl groups or phenyl groups or combinations thereof.

5. Silicone elastomer compositions according to claim 1 wherein polyorganosiloxane (B) has a viscosity of less than 100 cSt at 25° C.

6. Silicone elastomer compositions according to claim 1 wherein polyorganosiloxane (B) is represented by the general formula:

$$\left[ \begin{array}{c} CH_3 \\ | \\ Si\text{---}O \\ | \\ CH=CH_2 \end{array} \right]_p$$

wherein p represents a number in the range of 3–10 inclusive.

7. Silicone elastomer compositions according to claim 1 wherein $R^3$ represents a methyl group.

8. Silicone elastomer compositions according to claim 1 whewrein $R^4$ represents a tert-butyl group.

9. Silicone elastomer compositions according to claim 1 wherein peroxyester (C) is tert-butyl peroxybenzoate.

* * * * *

UNITED STATES PATENT AND TRADEMARK OFFICE
CERTIFICATE OF CORRECTION

PATENT NO.  : 4,451,634
DATED       : May 29, 1984
INVENTOR(S) : M. Hatanaka and A. Kurita It is certified that error appears in the above-identified patent and that said Letters Patent are hereby corrected as shown below:

On the cover page, after "Assignee", please delete

"General Electric Company, Waterford, N.Y." and insert therefor  -- Toshiba Silicone Co., Ltd., Tokyo, Japan --.

Signed and Sealed this

Twentieth Day of November 1984

[SEAL]

Attest:

GERALD J. MOSSINGHOFF

Attesting Officer    Commissioner of Patents and Trademarks